Oct. 11, 1927.
J. ROSS ET AL
1,645,351
VANITY BOX
Filed June 13, 1927
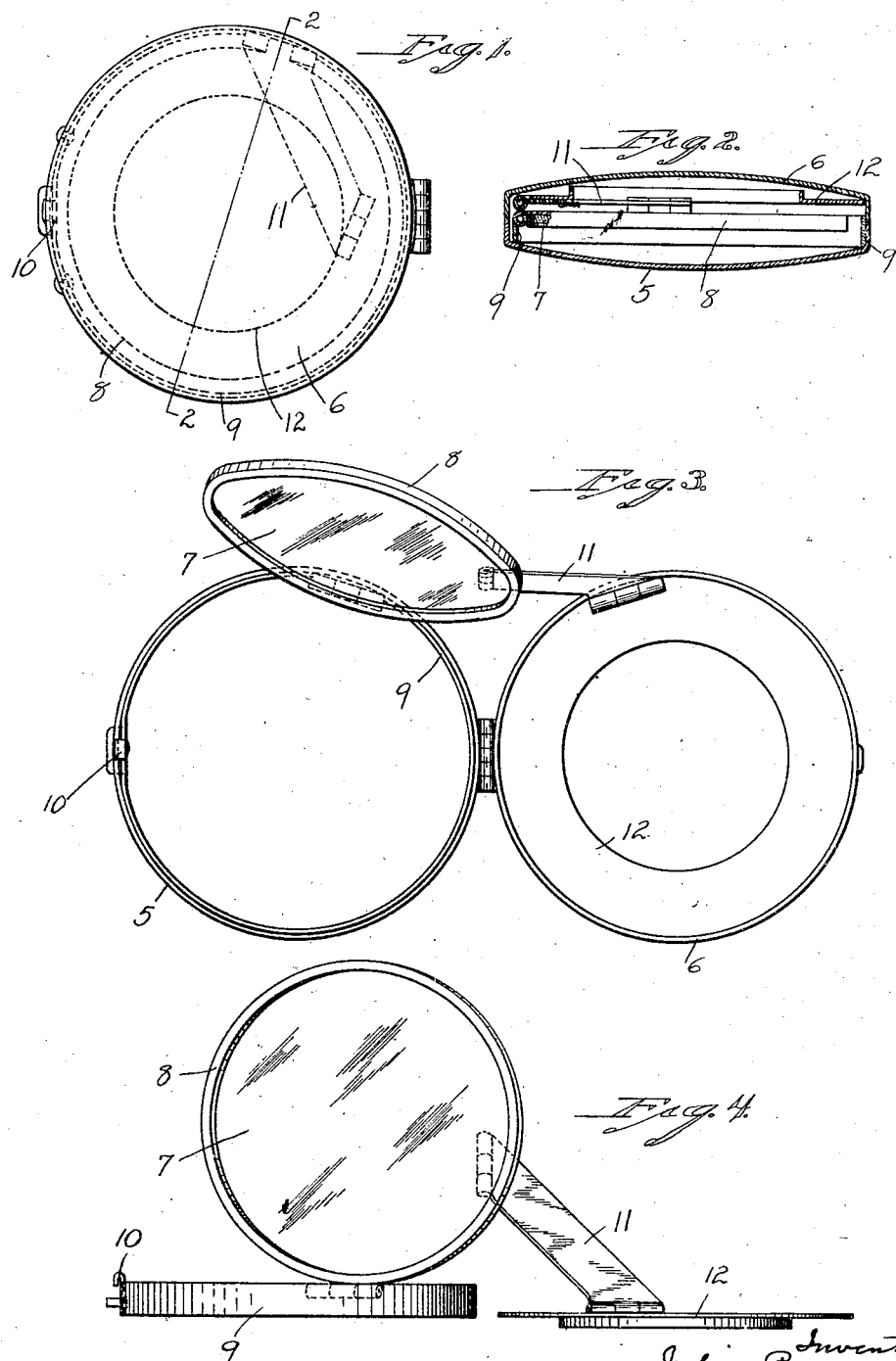

Patented Oct. 11, 1927.

1,645,351

UNITED STATES PATENT OFFICE.

JULIUS ROSS AND EMIL A. SCHUELKE, OF MERIDEN, CONNECTICUT, ASSIGNOR TO THE NAPIER CO., OF MERIDEN, CONNECTICUT, A CORPORATION.

VANITY BOX.

Application filed June 13, 1927. Serial No. 198,327.

This invention relates to an improvement in vanity boxes, and particularly to vanity boxes having a mirror connected with both the box and cover, so that when the cover is opened, the mirror will be raised, and the invention is an improvement over the device shown in Patent No. 1,579,542, granted April 6, 1926. In the device shown by the drawings of the patent, the mirror was hinged to the box and connected by a hinged strap directly with the cover. The object of this invention is to so mount the mirror that the device can be more readily assembled and yet the movement of the mirror will be the same as in the patent referred to, that is, when the cover is opened the mirror will be raised, and the invention consists in the construction as hereinafter described and particularly recited in the claims.

In the accompanying drawings:

Fig. 1 is a face view of a vanity box constructed in accordance with our invention;

Fig. 2 is a sectional view on the line 2—2 of Fig. 1;

Fig. 3 is a plan view of the box with the cover in the open position; and

Fig. 4 is a side view of the mirror, spring, plate, and connecting-strap, detached.

In carrying out our invention, we employ a box 5 and a cover 6 hinged thereto. A mirror 7 is mounted in a plate 8, and this plate is hinged to a spring-ring 9 closely fitting the inside of the box and forming a spring for a locking-button 10 which engages with the cover when the box is closed.

Hinged to the plate 8 is a strap 11 which is hinged to a compact holding flat ring 12 which closely fits the cover 6.

The parts operate in the same way as in the patent above referred to, that is, when the box is opened, the plate 8 carrying the mirror is raised to clear both the box and cover, and when the cover is closed, the mirror is folded into the box.

By connecting the plate 8 with the spring 9 and with the ring 12, the parts may be more readily assembled, as the plate 8 can be connected to the spring 9 and ring 12 before the spring and ring are inserted into the box and cover, but when assembled, the parts are firmly coupled together.

We claim:

1. The combination with a box, of a cover hinged thereto, a spring mounted in the box, a ring mounted in the cover, a plate hinged to the spring, a strap hinged to the plate and to the said ring, whereby, when the box is opened, the plate is lifted to clear both the box and cover.

2. The combination with a box, of a cover hinged thereto, a spring mounted in the box, a plate hinged to the spring, a strap hinged at one end to the plate and connected at the other end with the cover, whereby, when the box is opened, the plate is lifted to clear both the box and cover.

In testimony whereof, we have signed this specification.

JULIUS ROSS.
EMIL A. SCHUELKE.